(12) United States Patent
Lee (10) Patent No.: US 9,777,425 B2
(45) Date of Patent: Oct. 3, 2017

(54) DRAIN HOSE HOLDER FOR A WASHING MACHINE

(71) Applicant: SAMSUNG ELECTRONICS CO., LTD., Suwon-si, Gyeonggi-do (KR)

(72) Inventor: Seul Gi Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 14/539,395

(22) Filed: Nov. 12, 2014

(65) Prior Publication Data

US 2015/0128663 A1    May 14, 2015

(30) Foreign Application Priority Data

Nov. 13, 2013    (KR) .................. 10-2013-0137956

(51) Int. Cl.
*D06F 39/08*    (2006.01)
*D06F 39/12*    (2006.01)
*F16L 3/00*    (2006.01)

(52) U.S. Cl.
CPC .......... *D06F 39/083* (2013.01); *D06F 39/085* (2013.01); *D06F 39/12* (2013.01); *F16L 3/003* (2013.01)

(58) Field of Classification Search
None
See application file for complete search history.

(56) References Cited

U.S. PATENT DOCUMENTS

| 1,236,546 | A | * | 8/1917 | Cook ....................... F16L 33/04 |
| | | | | 24/275 |
| 2,655,072 | A | * | 10/1953 | Poupitch ................. F16B 2/243 |
| | | | | 24/295 |
| 6,311,936 | B1 | | 11/2001 | Herr et al. |

(Continued)

FOREIGN PATENT DOCUMENTS

EP    2647753 A1    10/2013
KR    10-2006-0031300    4/2006

OTHER PUBLICATIONS

Extended European Search Report dated Mar. 13, 2015 in corresponding European Patent Application No. 14186263.1.

(Continued)

*Primary Examiner* — Michael Barr
*Assistant Examiner* — Rita Adhlakha
(74) *Attorney, Agent, or Firm* — Staas & Halsey LLP (57)    ABSTRACT

A washing machine includes a cabinet forming an external appearance of the washing machine, a tub provided in the cabinet to accommodate wash water, a drain pump coupled to a drain hose configured to guide wash water pumped by the drain pump to outside of the cabinet, and a holder coupled to an outer surface of the cabinet to fix the drain hose to the cabinet. The holder is coupled to the outer surface of the cabinet while having both ends coupled to each other to form an accommodation hole surrounding the outer circumferential surface of the drain hose, and at least one movement preventing protrusion formed on an inner circumferential surface of the holder to prevent the drain hose from being separated from the holder protrudes toward inside of the holder to come into contact with the outer circumferential surface of the drain hose.

8 Claims, 6 Drawing Sheets

(56) References Cited

U.S. PATENT DOCUMENTS

| | | | |
|---|---|---|---|
| 8,459,064 B2* | 6/2013 | Haltmayer | A47L 15/4223 |
| | | | 248/75 |
| 2007/0101774 A1 | 5/2007 | Lee | |
| 2012/0255330 A1* | 10/2012 | Wanweerakul | D06F 39/083 |
| | | | 68/208 |

OTHER PUBLICATIONS

Decision on Grant dated Jan. 27, 2017 in corresponding European Patent Application No. 14 186 263.1, 26 pages.

* cited by examiner

DRAIN HOSE HOLDER FOR A WASHING MACHINE

CROSS-REFERENCE TO RELATED APPLICATIONS

This application claims the benefit of Korean Patent Applications No. 10-2013-0137956, filed on Nov. 13, 2013 in the Korean Intellectual Property Office, the disclosure of which is incorporated herein by reference.

BACKGROUND

1. Field

One or more embodiments relate to a washing machine, and more particularly, to a washing machine having an improved structure capable of preventing natural drainage by fixing a drain hose.

2. Description of the Related Art

In general, a washing machine is an apparatus that removes dirt from laundry by applying detergent and mechanical force to contaminated laundry that is put in the washing machine and performing washing, rinsing, draining and drying processes. The washing machine includes a cabinet forming an external appearance of the washing machine, a drum in which a laundry is put, a motor rotating the drum forward and backward, a water supply hose supplying wash water to the inside of the drum and a drain hose draining wash water, to perform a washing cycle.

The washing machine is recently in the trend of introducing water during a draining process to be higher than a water level of a tub by use of a drain hose and then draining downward without directly introducing water downward, to prevent natural drainage in which water in a tub is rapidly drained by an unintentional loss of power, such as a power failure. Accordingly, the washing machine having the above drainage structure needs to have the drain hose thereof fixed to a surface of a cabinet of the washing machine during washing, rinsing and draining processes, and thus there is a need for a fixing apparatus of the drain hose.

In general, a drain hose of a washing machine is fixed to one surface of a cabinet by a screw. In this case, the drain hose may be easily separated from the one surface of the cabinet by a user, which may cause a natural drainage.

In order to prevent the drain hose from being separated by a user from the surface of the cabinet, a separation prevention label may be attached to the drain hose. However, the attaching of the separation prevention label requires an additional component and process, and thus degrades the manufacturing efficiency.

SUMMARY

The foregoing described problems may be overcome and/or other aspects may be achieved by one or more embodiments of a washing machine having an improved structure capable of preventing a drain hose from being randomly separated from a cabinet by a user.

The foregoing described problems may be overcome and/or other aspects may be achieved by one or more embodiments of a washing machine having an improved structure capable of reducing the number of manufacturing processes while cutting the manufacturing cost.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a washing machine may include a cabinet, a tub, a drain pump, a drain hose, and a holder. The cabinet may form an external appearance of the washing machine. The tub may be provided in the cabinet to accommodate wash water. The drain pump may be provided at a lower side of the tub to discharge the wash water accommodated in the tub to outside of the cabinet. The drain hose may be configured to guide wash water pumped by the drain pump to outside of the cabinet. The holder may be coupled to an outer surface of the cabinet to fix the drain hose to the cabinet. The holder may be coupled to the outer surface of the cabinet while having both ends thereof coupled to each other to form an accommodation hole surrounding the outer circumferential surface of the drain hose. At least one movement preventing protrusion formed on an inner circumferential surface of the holder to prevent the drain hose from being separated from the holder may protrude toward inside of the holder to come into contact with the outer circumferential surface of the drain hose.

The holder may include a support part fixed to the outer surface of the cabinet. One end of the support part may have a fastening hole recessed toward the outer surface of the cabinet.

The holder may further include an extension part extending from the support part to form the accommodation hole together with the support part. The extension part may be formed at one end thereof with a hook that may be inserted into the fastening hole.

The cabinet may be formed with an insertion hole corresponding to the fastening hole. The hook may be coupled to the insertion hole by passing through the fastening hole.

The hook may include a body extending from the one end of the extension part toward the outer surface of the cabinet, and a head connected to the body to protrude toward outside of the body and configured to be coupled to the insertion hole by passing through the fastening hole.

The head may contract toward the body such that the hook is coupled to the insertion hole, and as the hook is coupled to the insertion hole, may be spread toward the outside of the body to prevent the hook from being separated from the insertion hole.

The insertion hole may be formed at a vertical position equal to or higher than half of height of the cabinet from a bottom surface of the cabinet such that the holder is located at an upper side of the drain pump.

In accordance with one or more embodiments, a washing machine may include a cabinet, a tub, a drain pump, a drain hose and a holder. The cabinet may form an external appearance of the washing machine. The tub may be provided in the cabinet to accommodate wash water. The drain pump may be provided at a lower side of the tub to discharge the wash water accommodated in the tub to outside of the cabinet. The drain hose may be configured to guide wash water pumped by the drain pump to outside of the cabinet. The holder may be installed on a rear surface of the cabinet to fix the drain hose to the rear surface of the cabinet. A hook formed at one end of the holder may be fixed to the rear surface of the cabinet by passing through a fastening hole formed at the other end of the holder such that the holder surrounds an outer circumferential surface of the drain hose.

The other end of the holder may be fixed to the rear surface of the cabinet.

An insertion hole corresponding to the fastening hole may be formed through the rear surface of the cabinet. The hook may be fixed to the rear surface of the cabinet by sequentially passing through the fastening hole and the insertion hole.

As the hook is fixed to the rear surface of the cabinet by sequentially passing through the fastening hole and the insertion hole, an accommodation hole into which the drain hose is inserted may be formed inside the holder.

A movement preventing protrusion may be formed on an inner circumferential surface of the holder to prevent the drain hose from being separated from the holder. The movement preventing protrusion protrudes toward inside of the accommodation hole so as to be coupled between wrinkles formed on the outer circumferential surface of the drain hose.

A holder for a drain hose of a washing machine includes a first end and a second end configured to be coupled to each other such that the holder forms an accommodation hole surrounding an outer circumferential surface of the drain hose and at least one movement preventing protrusion protruding toward an inside of the accommodation hole so as to be coupled between wrinkles formed on the outer circumferential surface of the drain hose.

The first end of the holder comprises a support part fixed to the outer surface of a cabinet of the washing machine; and the support part comprises a fastening hole recessed toward an outer surface of the cabinet.

The second end of the holder comprises an extension part extending from the support part to form the accommodation hole together with the support part; and the extension part comprises a hook to be inserted into the fastening hole.

The cabinet is formed with an insertion hole corresponding to the fastening hole; and the hook is coupled to the insertion hole by passing through the fastening hole.

The hook includes a body extending from the one end of the extension part toward the outer surface of the cabinet; and a head connected to the body to protrude outward from the body and configured to be coupled to the insertion hole by passing through the fastening hole.

The head contracts toward the body such that the hook is coupled to the insertion hole, and as the hook is coupled to the insertion hole, the hook is spread toward an outside of the body to prevent the hook from being separated from the insertion hole.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 1:
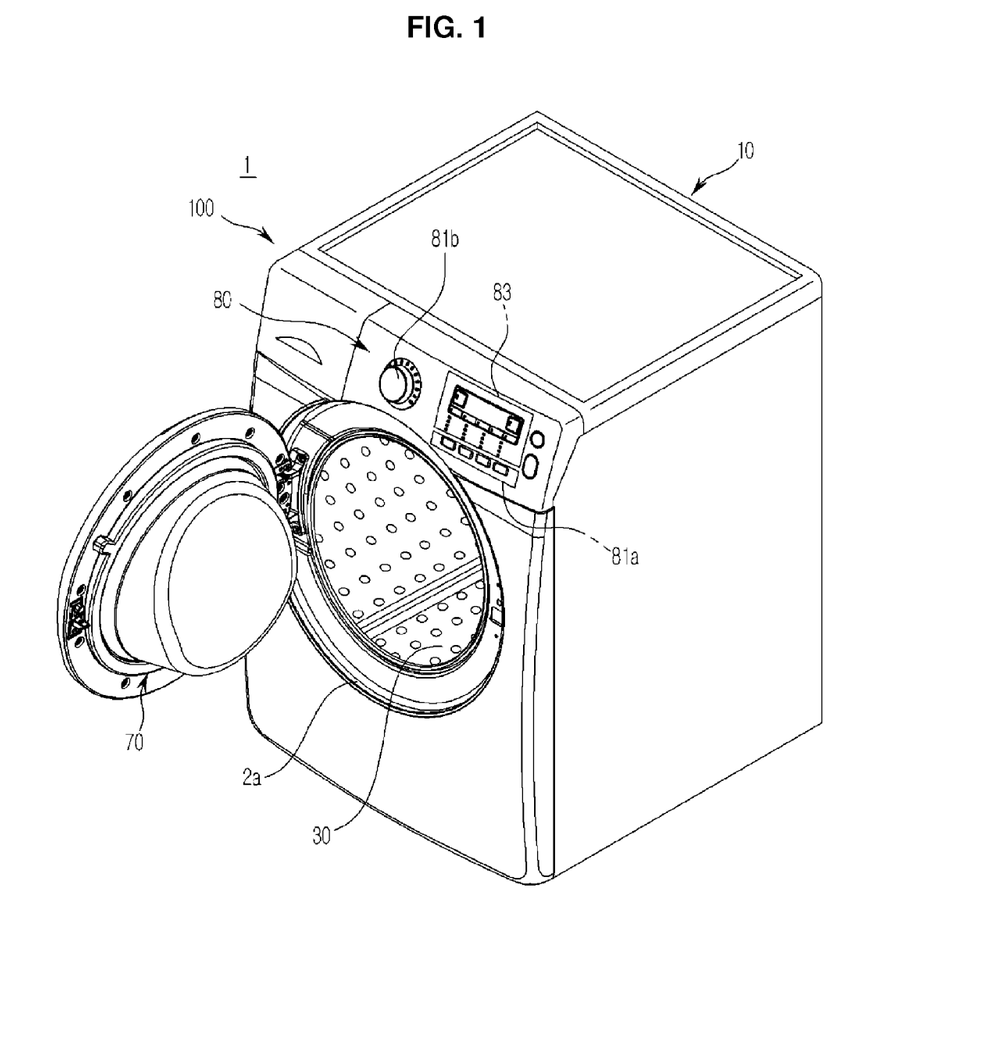
FIG. 1 is a perspective view illustrating an external appearance of a washing machine in accordance with one or more embodiments.
Figure 2:
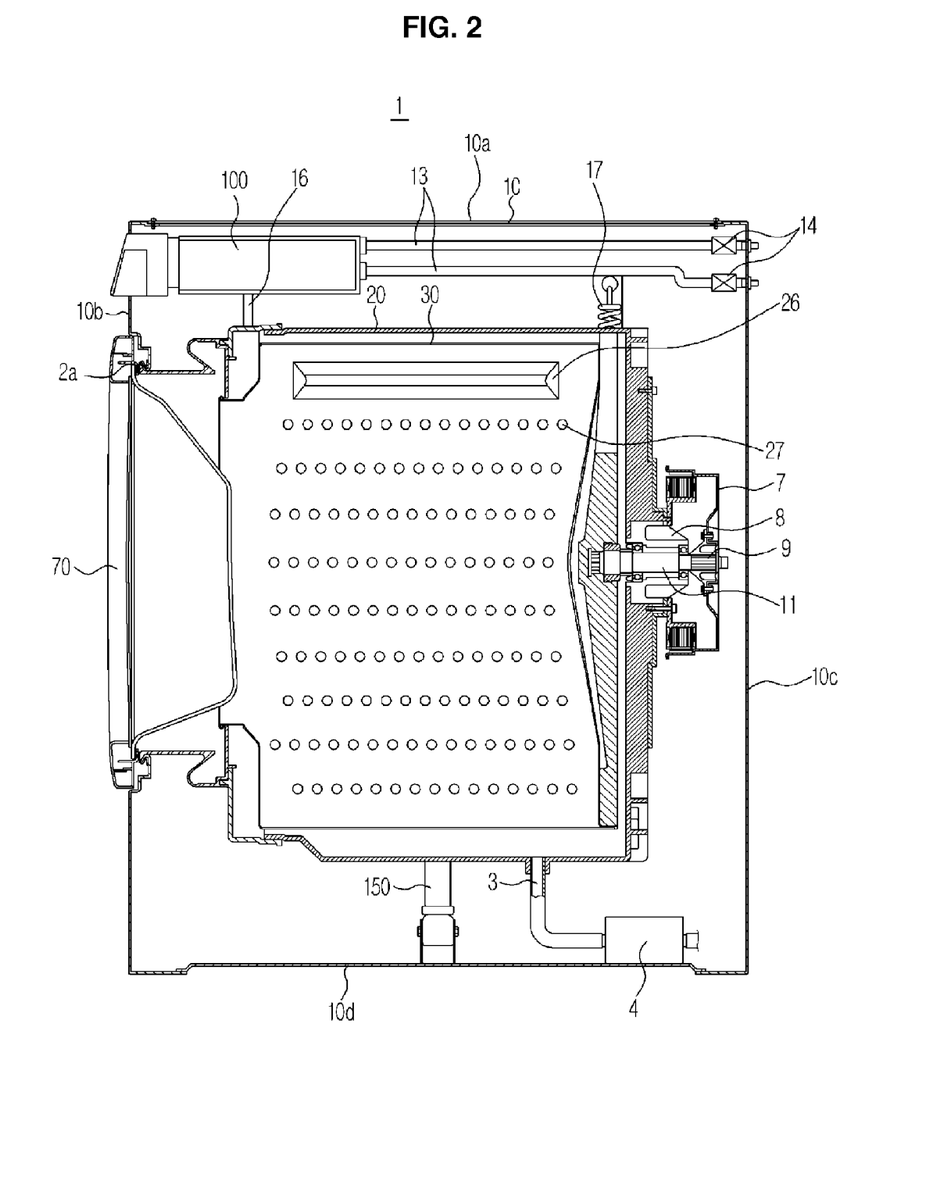
FIG. 2 is a cross sectional view illustrating a configuration of the washing machine in accordance with one or more embodiments.
Figure 3:
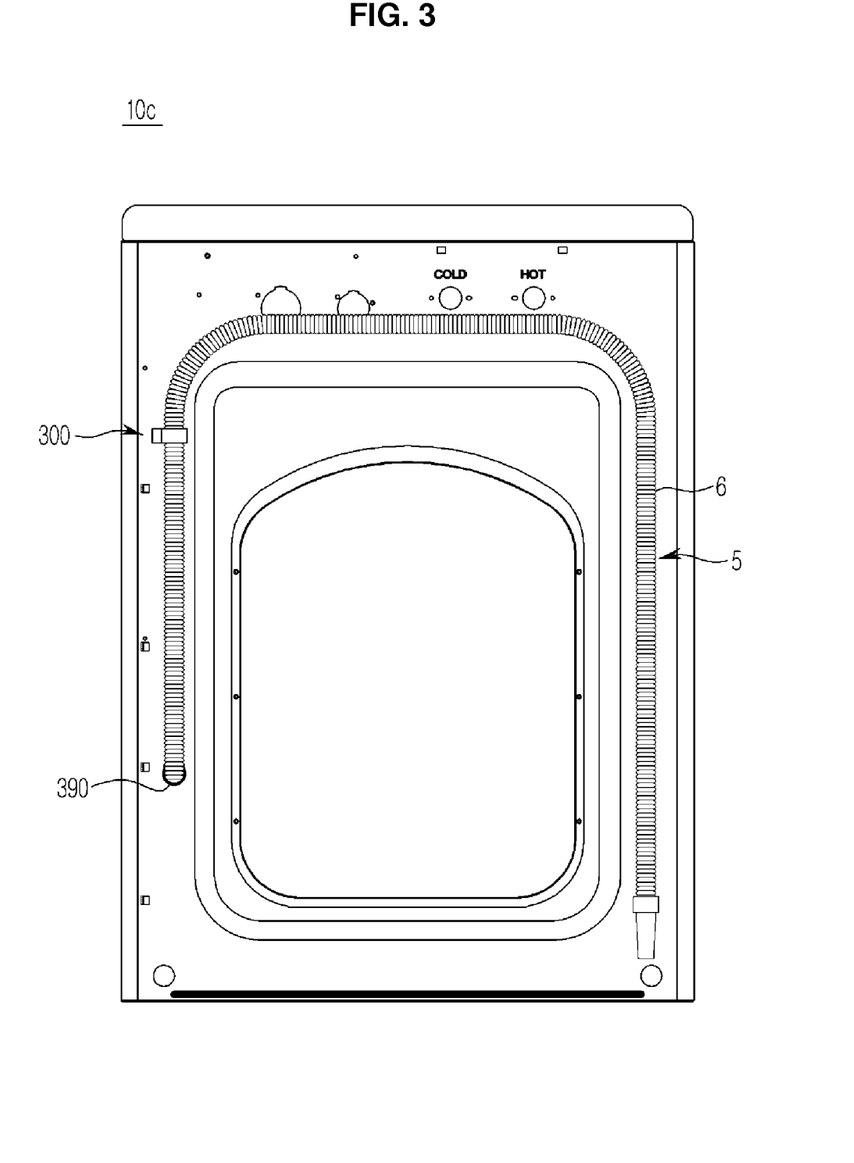
FIG. 3 is a rear view illustrating a rear surface of a cabinet of the washing machine in accordance with one or more embodiments.
Figure 4:
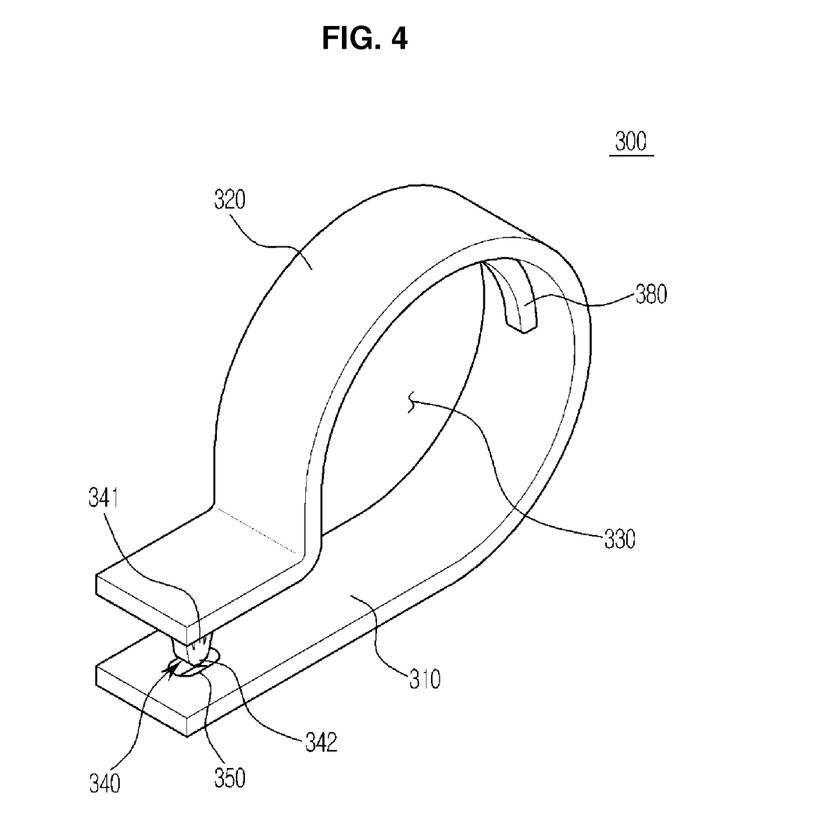
FIG. 4 is a perspective view illustrating a holder of the washing machine in accordance with one or more embodiments.

FIG. 1 is a perspective view illustrating an external appearance of a washing machine in accordance with one or more embodiments. FIG. 2 is a cross sectional view illustrating a configuration of the washing machine in accordance with one or more embodiments. FIG. 3 is a rear view illustrating a rear surface of a cabinet of the washing machine in accordance with one or more embodiments. FIG. 4 is a perspective view illustrating a holder of the washing machine in accordance with one or more embodiments.

Referring to FIGS. 1 to 4, a washing machine 1 may include a cabinet 10 that may form the external appearance of the washing machine 1, a tub 20 that may accommodate wash water and rinsing water that are used during a washing cycle and a rinsing cycle, a drum 30 that may accommodate a laundry, and a driving motor 7 that may rotate the drum 30.

The cabinet 10 may be provided with a control panel 80 that may include input parts 81a and 81b to receive an operation command for the washing machine 1 and a display part 83 to display operation information of the washing machine 1.

The input parts 81a and 81b may receive a command of a user related to an operation of the washing machine 1, for example, the time of a washing operation, the number of rinsing operations, the time for a drainage operation and a start/temporary stop. The input parts 81a and 81b may use, for example, a press-in button or a rotary type button 81b, etc. In addition, the display part 83 may display information related to a cycle being performed by the washing machine 1 and the time remaining until a washing operation ends. The display part 83 may use, for example, a liquid crystal display (LCD) panel, or a light emitting diode (LED) panel, etc.

Although the washing machine 1 in accordance with one or more embodiments is illustrated as separately forming the input parts 81a and 81b from the display part 83, the embodiments are not limited thereto. For example, an input part may be integrally formed with a display part by using a touch screen panel (TSP) or the like.

In addition, the cabinet 10 may include frames 10a, 10b, 10c and 10d, referred to as an upper side frame 10a, a front side frame 10b and a rear side frame 10c, forming an upper side, a front side and a rear side of the cabinet 10, respectively, plus a lateral side frame (not shown) and a lower side frame 10d forming a lateral side and a lower side of the cabinet 10, respectively, while connecting the front side frame 10b to the rear side frame 10c.

The front side frame 10b of the cabinet 10 may be provided with an inlet port 2a allowing laundry to be introduced to the inside of the drum 30 therethrough. The input port 2a may be open and closed by a door 70 that may be installed on the front side frame 10b of the cabinet 10.

A spring 17 may be provided between the tub 20 and the cabinet 10 to support the tub 20 at an upper side. The spring 17 may serve to absorb the vibration and noise generated as the tub 20 moves, through an elastic force thereof.

A water supply pipe 13 may be installed at an upper side of the tub 20 to supply wash water to the tub 20. A water supply valve 14 may be installed at one side of the water supply pipe 13.

A detergent supply device 100 may be connected to the tub 20 through a connecting pipe 16. Water supplied through the water supply pipe 13 may be supplied to the inside of the tub 20 via the detergent supply device 100 together with detergent.

The tub 20 may be supported by a damper 150. The damper 150 may connect a bottom surface of inside of the cabinet 10 to an outer surface of the tub 20. In addition, the damper 150 may be located at upper, left and right sides of the inside of the cabinet 10 to support the tub 20, in addition to the bottom surface of inside of the cabinet 10. The damper 150 or the spring 17 at upper and lower sides of the tub 20 may absorb vibration and impact generated as the tub 20 moves up and down.

The tub 20 may be supported by at least one damper 150.

A driving shaft 11 may be connected to a rear surface of the drum 30 to transmit a driving force of the motor 7. A plurality of through holes 27 may be formed through a circumference of the drum 30 to circulate wash water. A plurality of lifters 26 may be installed at an inner circumferential surface of the drum 30 to lift and drop the laundry when the drum 30 rotates.

The driving shaft 11 may be disposed between the drum 30 and the motor 7. One end of the driving shaft 11 may be connected to a rear side panel of the drum 30, and the other end of the driving shaft 11 may extend to the outside of a rear side wall of the tub 20. As the motor 7 drives the driving shaft 11, the drum 30 connected to the driving shaft 11 may rotate on the driving shaft 11.

A bearing housing 8 may be installed at the rear side wall of the tub 20 to rotatably support the driving shaft 11. The bearing housing 8 may include, for example, an aluminum alloy or the like, and may be inserted into the rear side wall of the tub 20 when the tub 20 is formed through an injection molding. Bearings 9 may be installed between the bearing housing 8 and the driving shaft 11 to smoothly rotate the driving shaft 11.

The tub 20 may be provided at a lower side thereof with a drain pump 4 to discharge water in the tub 20 to the outside of the cabinet 10, a connection hose 3 connecting the tub 20 to the drain pump 4 such that water in the tub 20 is introduced to the drain pump 4, and a drain hose 5 to guide water pumped by the drain pump 4 to the outside of the cabinet 10.

The drain hose 5 may extend out of a rear surface of the cabinet 10 by passing through a through hole 390 that may be formed through the rear side frame 10c of the cabinet 10. The drain hose 5 extending out of the rear side of the cabinet 10 may be fixed to an outer circumferential surface of the rear side frame 10c by a holder 300.

The holder 300 may include a support part 310, an extension part 320 and a movement preventing protrusion 380.

The support part 310 of the holder 300 may be fixed to the outer circumferential surface of the rear side frame 10c. One end of the support part 310 may have a fastening hole 350 recessed toward the rear side frame 10c.

The extension part 320 may extend from the support part 310 such that an inner circumferential surface of the extension part 320 faces an inner circumferential surface of the support part 310. The extension part 320 may extend from the support part 310 while being bent to be convex toward a rear side of the cabinet 10.

The extension part 320 may be provided at one end thereof with a hook 340 inserted into the fastening hole 350.

The hook 340 may include a body 341 and a head 342.

The body 341 may extend from the extension part 320 toward the outer circumferential surface of the rear side frame 10c. The head 342 may be connected to one end of the body 341 which faces the outer circumferential surface of the rear side frame 10c, and may protrude to an outside of the body 341.

The head 342 may be coupled to an insertion hole 360 that may be formed through the rear side frame 10c while corresponding to the fastening hole 350, by passing through the fastening hole 350. In detail, a locking part 343 (see FIG. 5) may be formed at one end of the head 342 which may be headed to the extension part 320. As the head 342 passes through the insertion hole 360, the locking part 343 may come into close contact with an inner circumferential surface of the rear side frame 10c around the insertion hole 360, to possibly prevent the head 342 from being separated from the insertion hole 360.

When the hook 340 sequentially passes through the fastening hole 350 and the insertion hole 360, the head 342 may contract toward the body 341, and when the hook 340 is fixed to the rear side frame 10c after sequentially passing through the fastening hole 350 and the insertion hole 360, the head 342 may be spread toward outside of the body 341 and the locking part 343 may come into close contact with the inner circumferential surface of the rear side frame 10c around the insertion hole 360, to prevent the head 342 from being separated from the insertion hole 360.

The holder 300 may form an accommodation hole 330 into which the drain hose 5 may be inserted. The accommodation hole 330 may be formed as the hook 340 is coupled to the insertion hole 360 by passing through the fastening hole 350 such that the holder 330 surrounds an outer circumferential surface of the drain hose 5.

At least one movement preventing protrusion 380 may be formed on an inner circumferential surface of the accommodation hole 330.

The at least one movement preventing protrusion 380 may be formed on the inner circumferential surface of the accommodation hole 330 to possibly prevent the drain hose 5 from being separated from the holder 300. In detail, the at least one movement preventing protrusion 380 may protrude toward an inside of the accommodation hole 330 or the holder so as to be coupled between wrinkles 6 formed on the outer circumferential surface of the drain hose 5.

The insertion hole 360 may have a vertical position equal to or higher than half of the height of the cabinet 10 from a bottom surface of the cabinet 10 such that the holder 300 is located at an upper side of the drain pump 4. Since the holder 300 may be installed at an upper side of the drain pump 4, natural drainage may be prevented from occurring along the drain hose 5 coupled to the holder 300.

A rib (not shown) may protrude from an outer circumferential surface of the holder 300 to reinforce the holder 300.

The holder 300 may be made of a material such as, for example, polyamide (nylon), polypropylene and rubber, or the like.

The bottom surface of the cabinet 10 may have a plurality of legs (not shown).

Figure 5:
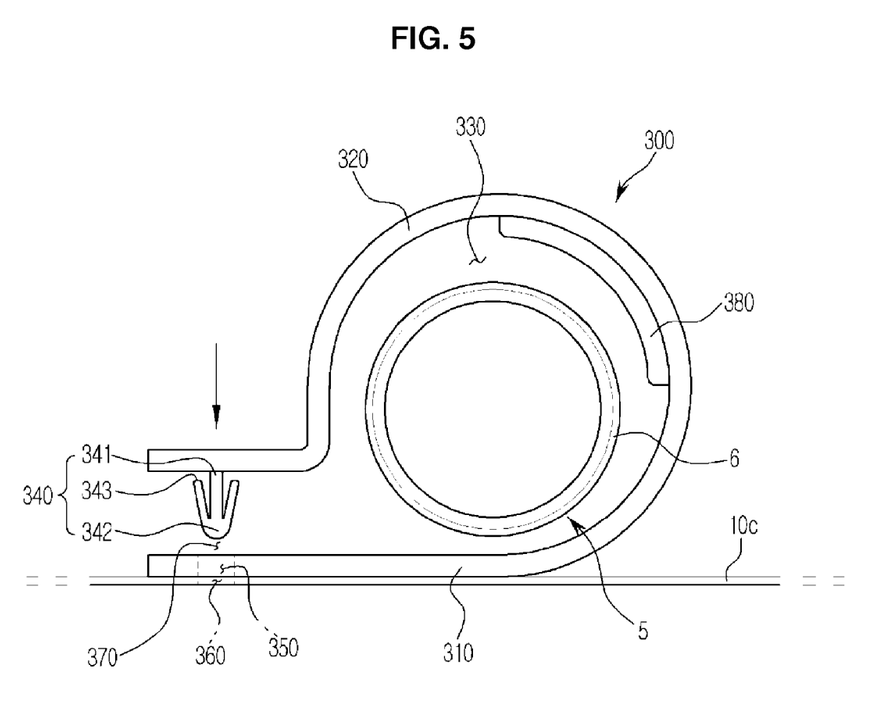
FIG. 5 is a cross sectional view showing a state before a holder according to one or more embodiments, such as the holder of FIG. 4, fixes a drain hose to a cabinet.
Figure 6:
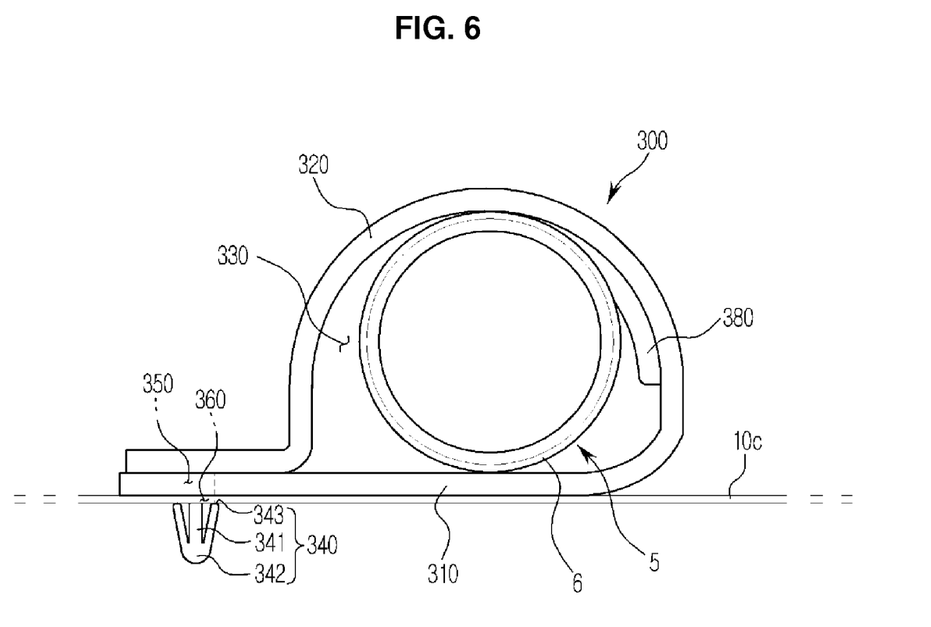
FIG. 6 is a cross sectional view showing a state after a holder according to one or more embodiments, such as the holder of FIG. 4 fixes a drain hose to a cabinet.

FIG. 5 is a cross sectional view showing a state before a holder according to one or more embodiments, such as the holder of FIG. 4, fixes a drain hose to a cabinet, and FIG. 6 is a cross sectional view showing a state after a holder according to one or more embodiments, such as the holder of FIG. 4, fixes a drain hose to a cabinet.

Referring to FIGS. 5 and 6, the support part 310 of the holder 300 may be kept fixed to the rear side frame 10c.

Before the holder 300 fixes the drain hose 5 to the rear side frame 10c, the extension part 320 extending from the support part 310 may be spaced apart from the support part 310. That is, the support part 310 and the extension part 320 of the holder 300 may be spaced apart from each other, to form an opening 370. The drain hose 5 is inserted into an inside of the holder 300 through the opening 370. When the drain hose 5 is inserted into the inside of the holder 300, a force may be applied to an outer circumferential surface of the extension part 320 toward the rear side frame 10c such that the hook 340 formed on the extension part 320 may pass through the fastening hole 350 formed through the support part 310. Accordingly, the hook 340 may pass through the fastening hole 350 and then may be coupled to the insertion hole 360 formed through the rear side frame 10c, and one end of the extension part 320 may come into close contact with one end of the support part 310, to form the accommodation hole 330 surrounding the outer circumferential surface of the drain hose 5. One of the wrinkles 6 that may be formed on the outer circumferential surface of the drain hose 5 may be fixedly locked with the at least one movement preventing protrusion 380 at the same time when the accommodation hole 330 is formed. As the hook 340 is coupled to the insertion hole 360, the locking part 343 of the hook 340 may be locked to the inner circumferential surface of the rear side frame 10c and thus the hook 340 may be prevented from being separated from the insertion hole 360 in an outer direction of the rear side frame 10c, so that the holder 300 may fix the drain hose 5 to the rear side frame 10c.

As is apparent from the above, the holder coupled to the cabinet through a hook scheme may be used to fix the drain hose to the cabinet, and thus the holder may be prevented from being randomly separated by a user.

Since a hook integrally formed with the holder may be coupled to the cabinet without using an additional fixing member, such as a screw, thereby cutting the manufacturing cost while reducing the number of manufacturing processes.

In addition, the holder for hook coupling may be used to fix the drain hose to a rear surface of the cabinet, to keep periphery parts of the washing machine in order, and a movement preventing protrusion may be formed at an inner circumferential surface of the holder to prevent the drain hose from being separated from the holder due to vibration generated during a washing process.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A washing machine comprising:
   a cabinet forming an external appearance of the washing machine;
   a tub provided in the cabinet to accommodate wash water;
   a drain pump provided at a lower side of the tub to discharge the wash water accommodated in the tub to an outside of the cabinet;
   a drain hose configured to guide the wash water pumped by the drain pump to the outside of the cabinet;
   a holder coupled to an outer surface of the cabinet to fix the drain hose to the cabinet, the holder further comprising:
      a support part fixed to the outer surface of the cabinet, one end of the support part including a fastening hole, and
      an extension part extending from the support part, the extension part being formed at one end thereof with a hook insertable into the fastening hole,
   wherein the holder is coupled to the outer surface of the cabinet while having both ends thereof coupled to each other to form an accommodation hole surrounding an outer circumferential surface of the drain hose, and
   wherein the cabinet is formed with an insertion hole corresponding to the fastening hole and the hook is couplable to the insertion hole of the cabinet by passing through the fastening hole of the holder.

2. The washing machine of claim 1,
   wherein the fastening hole is recessed toward the outer surface of the cabinet.

3. The washing machine of claim 2,
   wherein the extension part forms the accommodation hole together with the support part.

4. The washing machine of claim 3, wherein the hook comprises:
   a body extending from the one end of the extension part toward the outer surface of the cabinet; and
   a head connected to the body to protrude outward from the body and configured to be coupled to the insertion hole by passing through the fastening hole.

5. The washing machine of claim 4, wherein the head contracts toward the body such that the hook is coupled to the insertion hole, and as the hook is coupled to the insertion hole, the hook is spread toward outward from the body to prevent the hook from being separated from the insertion hole.

6. The washing machine of claim 3, wherein the insertion hole is formed at a vertical position equal to or higher than half of height of the cabinet from a bottom surface of the cabinet such that the holder is located at an upper side of the drain pump.

7. The washing machine of claim 1, further including:
   at least one movement preventing protrusion formed on an inner circumferential surface of the holder to prevent the drain hose from being separated from the holder and protruding toward an inside of the holder to come into contact with the outer circumferential surface of the drain hose.

8. The washing machine of claim 1, wherein the hook passes through the insertion hole of the cabinet and contacts an inner surface of the cabinet.

\* \* \* \* \*